No. 804,775. PATENTED NOV. 14, 1905.
H. G. SLINGLUFF.
GLASS FURNACE.
APPLICATION FILED JUNE 29, 1905.
3 SHEETS—SHEET 1.
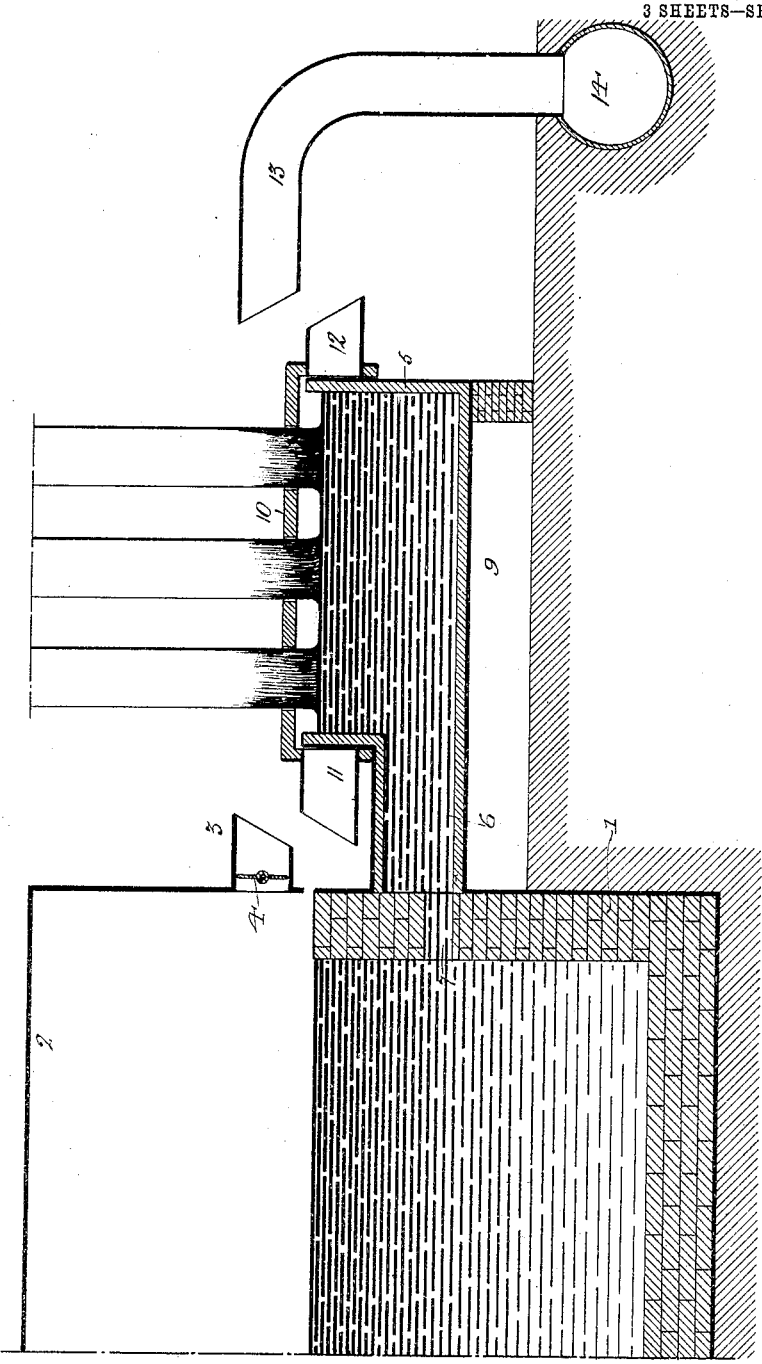

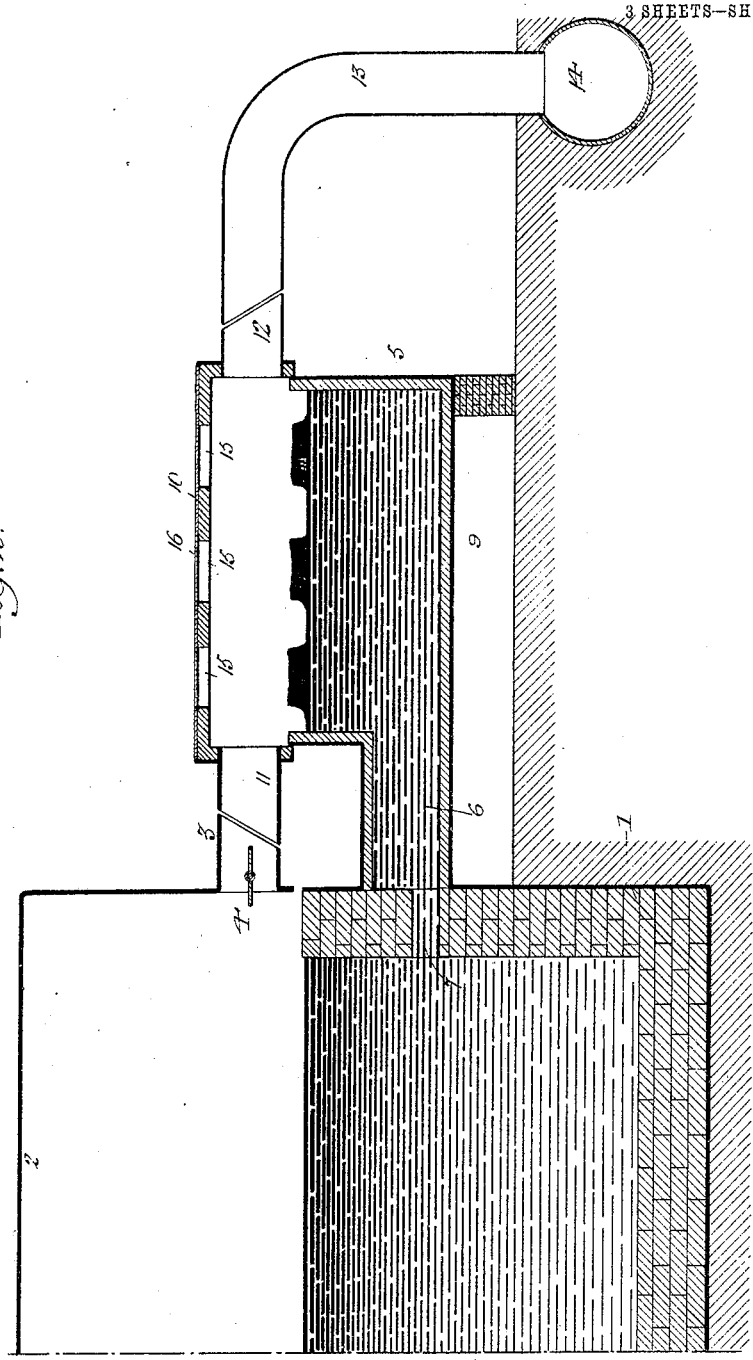

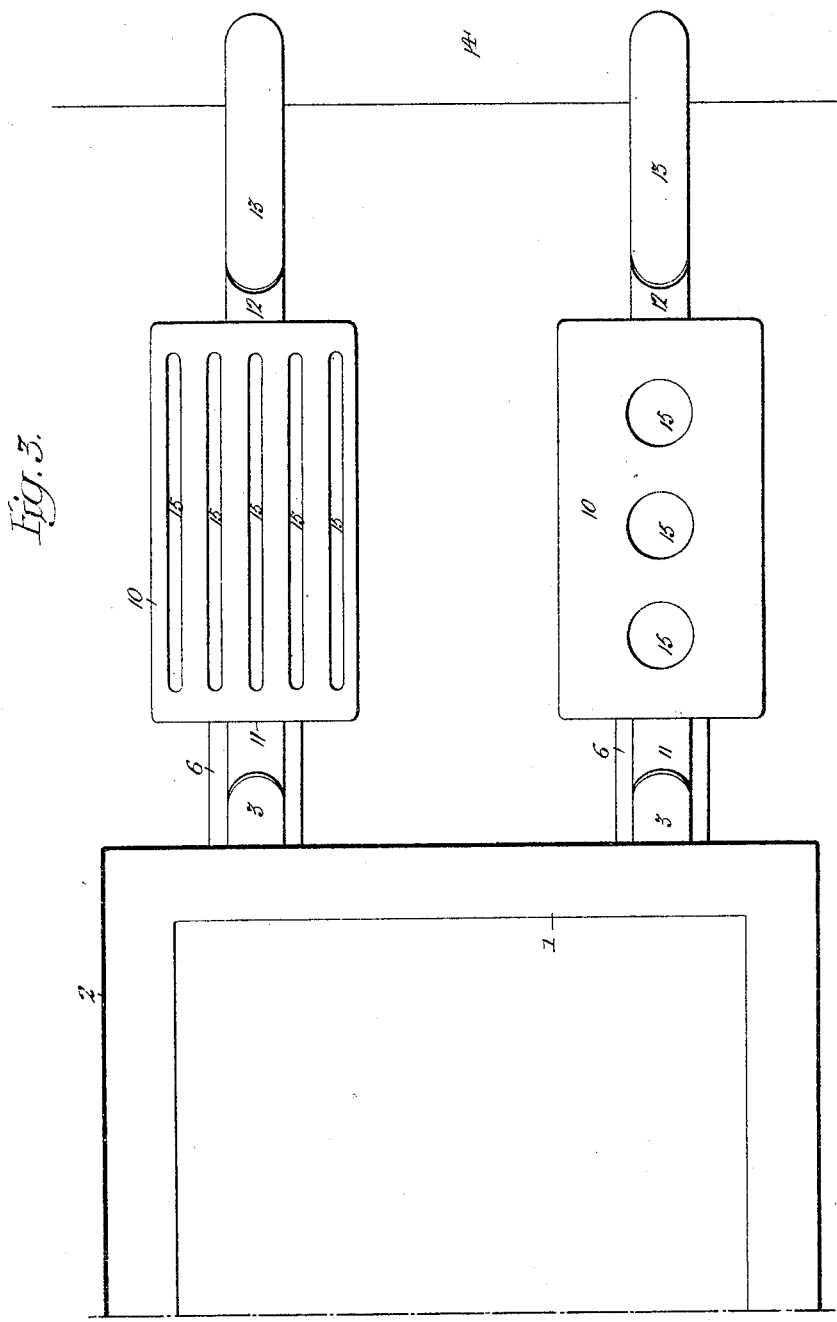

UNITED STATES PATENT OFFICE.

HARRY G. SLINGLUFF, OF HARTFORD CITY, INDIANA.

GLASS-FURNACE.

No. 804,775.     Specification of Letters Patent.     Patented Nov. 14, 1905.

Application filed June 29, 1905. Serial No. 267,647.

*To all whom it may concern:*

Be it known that I, HARRY G. SLINGLUFF, a citizen of the United States, and a resident of Hartford City, county of Blackford, State of Indiana, have invented certain new and useful Improvements in Glass-Furnaces, of which the following is a specification.

My invention consists of an improvement in glass furnaces or tanks to be used in connection with machinery for drawing sheets or cylinders of glass from the molten mass, the object of my invention being to provide such a furnace or tank with means whereby uniformity of product will be insured and waste of time or material prevented. This object I attain in the manner hereinafter set forth, reference being had to the accompanying drawings, in which—

Figure 1 is a longitudinal sectional view showing part of a glass-tank to which my invention has been applied and illustrating the parts in the position assumed by them when glass is being drawn from the tank. Fig. 2 is a similar view illustrating the parts in the position assumed by them during the intervals between the drawing operations, and Fig. 3 is a view partly in section and partly in plan or top view.

In operating certain machines for drawing glass in the form of cylinders or sheets from a mass of molten glass it is a common practice to ladle the molten glass from the melting-tank into a pot or other receptacle from which the glass is drawn; but this plan is objectionable because of the handling of the glass which it involves, the inability to maintain the glass at a uniform temperature, and the necessity of cleaning out the cold or chilled glass from the pot or other receptacle after each drawing operation and entirely refilling said receptacle with fresh molten glass before the next operation. My invention has been designed with the view of overcoming these objections.

In the drawings, 1 represents part of a glass-melting tank of any ordinary construction, and 2 part of the hood or cover therefor, which may also be constructed in any of the usual ways with the exception that it has at one end a short flue 3, with a movable valve or damper 4 therein. Adjoining the melting-tank I erect a drawing-tank 5, which may be constructed in any suitable manner, but which consists, preferably, of a metallic outer casing lined with fire clay, brick, or other refractory material, this tank having a similarly-lined neck 6, which abuts against and is properly connected to one of the walls of the melting-tank and communicates with the interior of the glass chamber of said tank through an opening 7 in said wall, as shown in Figs. 1 and 2.

Any desired form of valve or damper may be employed for controlling the flow of molten glass through the openings 7 and neck 6 into the drawing-tank 5, and the mass of glass in the drawing-tank and its neck may be maintained in a molten condition by heat applied externally to said neck and tank in any available way. For instance, a furnace may be constructed beneath the same, or the space beneath the tank and neck may constitute a flue 9, through which products of combustion from any adjacent source may be conveyed.

The tank 5 has a vertically-movable or telescopic hood or cover 10, from the opposite ends of which project short flue-sections 11 and 12, the flue-section 11 when the hood or cover 10 is raised, as shown in Fig. 2, forming a continuation of the flue-section 3 of the melting-tank hood 2, and the flue-section 12 under like conditions communicating with a flue 13, which in turn communicates with a main flue 14, leading to a stack or other draft-producer, so that when the parts are adjusted as shown in said Fig. 2 a flow from the melting-tank hood through the various flue-sections and through the hood or cover 10 will be maintained. The said hood or cover 10 has in it openings 15, through which glass may be drawn from the tank 5, these openings being cylindrical if tubes or cylinders of glass are to be drawn or in the form of slots if the glass is being drawn in sheets, both of these forms of opening being illustrated in Fig. 3. When the hood or cover 10 is in the elevated position shown in Fig. 2, the openings are closed by means of a cover-plate 16, which may be common to all of the openings, as shown, or each opening may have an independent cover-plate, if desired. When the glass is being drawn, the hood or cover 10 is lowered onto the tank 5, as shown in Fig. 1, so that when the tubes or sheets are cut off above the top of the hood the chilled portions of the glass projecting above the top of the molten mass in the tank will be as short as possible. When the drawing operation is completed, the hood or cover 10 is raised and the damper 4 in the flue-section 3, which was before closed, is opened, so that a flow of products of combustion from the melting-tank hood 2 through the hood or cover 10 will be permitted, as shown in Fig. 2, for the purpose of melting down the chilled portions of the glass, and after this result has been achieved the damper 4 is again closed and the hood or cover 10 again lowered preparatory to another drawing operation. By this means all waste of time and labor involved in filling, cleaning, or draining and refilling a special pot or receptacle independent of the melting-tank is prevented and the mass of glass from which the sheets or cylinders are being drawn is kept clean and pure and at a substantially uniform temperature, thus facilitating production and insuring uniform quality in the product.

As many drawing-tanks as desired may be employed in connection with the main melting-tank. In the present instance I have shown two of such drawing-tanks projecting from the end of the main melting-tank; but there may, if desired, be more than two, or such drawing-tanks may be combined with all sides of the melting-tank.

While I prefer in all cases to circulate the products of combustion from the melting-tank hood through the hood or cover of the drawing-tank in order to melt down the chilled portions of glass projecting above the molten mass in the drawing-tank, because of the economy resulting from the use of a supply of the products of combustion thus conveniently at hand, an independent supply of products of combustion may, if desired, be used.

Having thus described my invention, I claim and desire to secure by Letters Patent—

1. The combination of a glass-drawing tank, with a telescopic hood or cover having openings through which the glass can be drawn.

2. The combination of a glass-drawing tank, with a telescopic hood or cover, having openings through which the glass can be drawn, and other openings through which products of combustion can pass.

3. The combination of a glass-drawing tank, with a telescopic hood or cover, and means for conveying products of combustion through said hood or cover and over the top of the mass of glass in the drawing-tank, when the cover is elevated.

4. The combination of a glass-drawing tank, with a telescopic hood or cover having flue-sections, and permanent flue-sections with which said sections on the hood will register when said hood is elevated.

5. The combination of a glass-drawing tank, with an enveloping hood or cover therefor providing beneath it a space through which products of combustion may circulate, said hood having drawing-openings therein.

6. The combination of a glass-drawing tank, with an enveloping hood or cover therefor providing beneath it a space through which products of combustion may circulate, said hood having drawing-openings therein, and means for closing the said openings during the circulation of the products of combustion.

7. The combination of a glass-melting tank, with a series of drawing-tanks in communication therewith, so that glass may flow from one to the other, a series of flues through which products of combustion may be directed through said drawing-tanks above the level of the molten glass therein, and a draft-stack flue communicating with each of said circulating flues, substantially as specified.

8. A receptacle containing a mass of glass for drawing purposes, said receptacle having a movable enveloping top or hood forming above the mass of glass a heating-chamber for the reception or circulation of products of combustion in order to reduce the cold glass at the surface of the mass, substantially as specified.

9. A glass-melting tank or kiln having a movable enveloping top or hood forming above the mass of glass in the tank a heating-chamber for the reception or circulation of products of combustion in order to reduce the cold glass at the surface of the mass, substantially as specified.

10. A receptacle for containing a mass of glass for drawing purposes, said receptacle having a hood which can be lowered so as to be close to the top of said mass, or can be raised so as to form above said mass a heating-chamber for the reception or circulation of products of combustion in order to reduce the cold glass at the surface of the mass, substantially as specified.

11. A glass-melting tank or kiln having a movable top or hood which can be lowered so as to be close to the surface of a mass of glass contained in the tank, or can be raised so as to form above said mass a heating-chamber for the reception or circulation of products of combustion in order to reduce the cold glass at the surface of the mass, substantially as specified.

In testimony whereof I have signed my name to this specification in the presence of two subscribing witnesses.

HARRY G. SLINGLUFF.

Witnesses:
 EDGAR I. WINTERS,
 ROBERT L. KUNKEL.